(12) United States Patent
Lu

(10) Patent No.: US 9,427,926 B2
(45) Date of Patent: Aug. 30, 2016

(54) METHOD FOR PREPARING FIBROUS POLYMERIC ADSORPTION MATERIAL

(71) Applicant: SOOCHOW UNIVERSITY, Suzhou (CN)

(72) Inventor: Jianmei Lu, Suzhou (CN)

(73) Assignee: Soochow University, Suzhou (CN)

( * ) Notice: Subject to any disclaimer, the term of this patent is extended or adjusted under 35 U.S.C. 154(b) by 215 days.

(21) Appl. No.: 14/307,732

(22) Filed: Jun. 18, 2014

(65) Prior Publication Data

US 2015/0008602 A1 Jan. 8, 2015

(30) Foreign Application Priority Data

Jul. 3, 2013 (CN) .......................... 2013 1 0276844

(51) Int. Cl.
| | | |
|---|---|---|
| *D06M 13/07* | (2006.01) | |
| *D06M 13/02* | (2006.01) | |
| *D06M 13/13* | (2006.01) | |
| *D06M 13/123* | (2006.01) | |
| *D06M 13/165* | (2006.01) | |
| *D06M 13/175* | (2006.01) | |
| *D06M 13/418* | (2006.01) | |
| *D06M 13/419* | (2006.01) | |
| *D06M 13/224* | (2006.01) | |
| *D01F 6/16* | (2006.01) | |
| *D01F 6/20* | (2006.01) | |
| *D01F 11/04* | (2006.01) | |
| *B01J 20/26* | (2006.01) | |
| *B01J 20/28* | (2006.01) | |
| *B29D 99/00* | (2010.01) | |
| *B29L 31/00* | (2006.01) | |

(52) U.S. Cl.
CPC ...... *B29D 99/0078* (2013.01); *B29L 2031/731* (2013.01)

(58) Field of Classification Search
None
See application file for complete search history.

(56) References Cited

U.S. PATENT DOCUMENTS

2012/0215148 A1\* 8/2012 Ewert ..................... D01D 5/14
602/45

FOREIGN PATENT DOCUMENTS

JP 2014-172959 \* 9/2014 ........... C08G 77/388

OTHER PUBLICATIONS

Gregor et al., "Oleophilic Ion-Exchange Polymers. I." J. Am. Chem. Soc. (1965), vol. 87, No. 24, pp. 5525-5534.\*

\* cited by examiner

*Primary Examiner* — Daniel Berns
(74) *Attorney, Agent, or Firm* — SZDC Law P.C.

(57) ABSTRACT

A method of preparing a fibrous polymeric adsorption material includes preparing a linear polymer yarn from a linear polymer via melt-blow spinning, the linear polymer having a molecular weight of 15,000 to 20,000 g/mol; treating the linear polymer yarn with a crosslinking agent and a porogen agent; and heating the treated linear polymer yarn at 130 to 150° C. for 25 to 35 seconds to obtain the fibrous polymeric adsorption material. The fibrous polymeric adsorption material includes fibers with a diameter of 4 to 6 microns. The crosslinking agent is in an amount of 1 to 3 weight % of the linear polymer. The crosslinking agent is a diacrylate ester compound having Formula J1, J2 or J3. The porogen agent is in an amount of about 1 weight % of the fibrous polymeric adsorption material.

5 Claims, No Drawings

METHOD FOR PREPARING FIBROUS POLYMERIC ADSORPTION MATERIAL

The present invention claims priority to Chinese Patent Application No. 201310276844.4, filed on Jul. 3, 2013.

BACKGROUND OF THE INVENTION

The present invention relates to a method of preparing a fibrous polymeric adsorption material.

With the development of industrialization, environmental pollution problem has become a serious global problem. Organic wastewater, such as benzene, kerosene and gasoline (water-insoluble oily low molecular weight organic liquids), pollutes rivers and oceans, and there is an urgent need to treat the organic wastewater. High efficiency oil-adsorbing material can be re-generated and re-used after treating the organic wastewater, and thus effectively save resources and improve resource utilization. There are needs to develop new and more efficient oil absorption materials.

Granular oil absorption resin with a cross-linking chemical structure, capable of selectively adsorbing organic wastewater, provides a way for the effective treatment of organic wastewater pollution problems. High efficiency oil-adsorbing resin is a low degree crosslinking polymer using lipophilic monomer as a basic monomer unit. The oil absorbing mechanism of the oil-adsorbing resin is very similar to the mechanism of high efficiency water-absorbing resin. However, due to the limitations in the shape of the resin, the applications of high efficiency oil-absorbing resin are greatly restricted.

Fiber has a large specific surface area and can be made into various shapes according to the needs of processed products. The application field of fiber can be greatly expanded after being fabricated into adsorbent material, and fiber plays an active role in the organic wastewater treatment. Currently used adsorption fibers include carbon fiber and macro-porous fiber fabricated with traditional fiber material.

However, the currently used adsorption fibers adsorb the organic liquid mainly through physical "sticky," which leads to a low adsorption capacity and slow adsorption saturation time, and they cannot be used to efficiently treat the organic wastewater.

SUMMARY OF THE INVENTION

One embodiment provides a method of preparing a fibrous polymeric adsorption material including: preparing a linear polymer yarn from a linear polymer via melt-blow spinning, the linear polymer having a molecular weight of 15,000 to 20,000 g/mol; treating the linear polymer yarn with a crosslinking agent and a porogen agent; and heating the treated linear polymer yarn at 130 to 150° C. for 25 to 35 seconds to obtain the fibrous polymeric adsorption material. The fibrous polymeric adsorption material includes fibers with a diameter of 4 to 6 microns. The crosslinking agent is in an amount of 1 to 3 weight % of the linear polymer. The crosslinking agent is a diacrylate ester compound having Formula J1, J2 or J3:

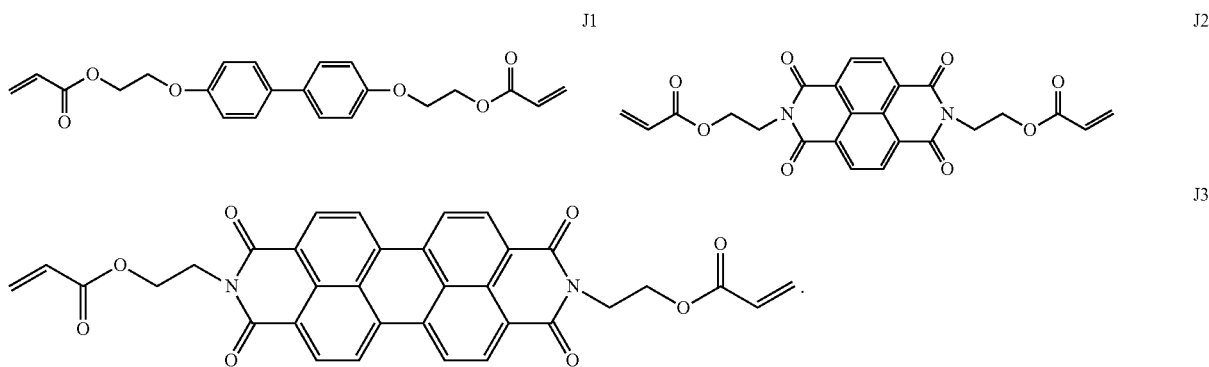

The porogen agent is in an amount of about 1 weight % of the linear polymer.

Another embodiment provides the linear polymer is a linear long chain ester of methacrylic acid, a methacrylic acid alkyl ester, a 9-(12-((4-vinylbenzyl)oxy)dodecyl) fused ring aromatic hydrocarbon, or a 12-(fused-aromatic-ring-9-yl)dodecyl esters, the long chain ester of methacrylic acid having a $C_6$-$C_{18}$ straight alkyl chain; the methacrylic acid alkyl ester having a $C_1$-$C_6$ straight-chain alkyl; and the fused ring aromatic hydrocarbon being benzene, naphthalene, or anthracene.

Another embodiment provides a melting point of the linear polymer is about 150° C.

Another embodiment provides the porogen agent is modified paraffin.

Another embodiment provides the modified paraffin is prepared by a process including: mixing solid paraffin with an aqueous dispersant solution, the aqueous dispersant solution having a concentration of 1-100 mg/mL; stirring the mixture of the solid paraffin and the aqueous solution at 60-100° C.; adding an acrylate monomer and benzoyl peroxide to the mixture of the solid paraffin and the aqueous dispersant solution to initiate a polymerization reaction; running the polymerization reaction for 2.5 to 4 hours; and placing the mixture into water to obtain the modified paraffin. The aqueous dispersant solution includes gelatin and hydroxyethyl cellulose, and a weight ratio of gelatin and glycolate cellulose is 1:2. The amount of benzoyl peroxide is 1-3 weight % of the acrylate monomer.

It is to be understood that both the foregoing general description and the following detailed description are exemplary and explanatory and are intended to provide further explanation of the invention as claimed.

DETAILED DESCRIPTION OF THE INVENTION

The present invention provides a method of preparing a fibrous polymeric adsorbent material. The fibrous polymeric adsorbent material has a fast absorption rate, large adsorption capacity, good strength, and reusable.

The method generally includes: melt-blow spinning of a low molecular weight linear polymer, post-crosslinking and pore-forming the linear polymer to obtain the fibrous absorbent material, and adjusting the structure of fibrous absorbent material by adding crosslinking and porogen agents.

Linear polymer yarn can be prepared from a linear polymer via melt-blow spinning. The linear polymer has a molecular weight of 15,000 to 20,000 g/mol. The linear polymer yarn can then be treated with a crosslinking agent and a porogen agent. The treated linear polymer yarn can be heated at relatively low temperature to obtain the polymeric adsorption material, which includes fibers with a diameter of 4 to 6 microns.

The amount of crosslinking agent used can be 1-3 weight % of the linear polymer, for example, 1 weight %, 1.5 weight %, 2 weight %, 2.5 weight %, or 3 weight %. The amount of porogen can 0.5 weight %, 1 weight %, or 1.5 weight % of the linear polymer. The treated linear polymer yarn can be heated at 130-150° C., for example, 130, 135, 140, 145, or 150° C., for 25-35 seconds, for example, 25 seconds, 30 seconds, or 35 seconds.

The crosslinking agent can be a diacrylate ester compound having Formula J1, J2, or J3:

bon or 12-(fused-aromatic-ring-9-yl)dodecyl ester. The long chain esters of methacrylic acid can have a $C_6$-$C_{18}$ straight alkyl chain. Methacrylic acid alkyl esters can have $C_1$-$C_6$ straight-chain hydrocarbons. The fused ring aromatic hydrocarbon can be benzene, naphthalene, anthracene, or anthracene.

The melting point of the linear polymer is preferably about 150° C.

In the above technical solution, the crosslinking agent can be a liquid, and the porogen can be melted under heat treatment. Melt-blow spinning is also a conventional technique.

The crosslinking process and crosslinking agent are both very important in the above-described method. The melting point of the linear polymer used for spinning shall be below the decomposition temperature of the linear polymer. The polymer shall be a linear polymer; and the distribution of the molecular weight cannot be too wide. Otherwise, the linear polymer will not satisfy the conditions for melt-blow spinning. If the linear polymer is used to treat organic wastewater, the linear polymer will be easily dissolved by the organic compound in wastewater. The present invention provides a solution to this problem. Specifically, the linear polymer is first converted to a linear polymer yarn, and the yarn is then crosslinked. This method ensures that the linear

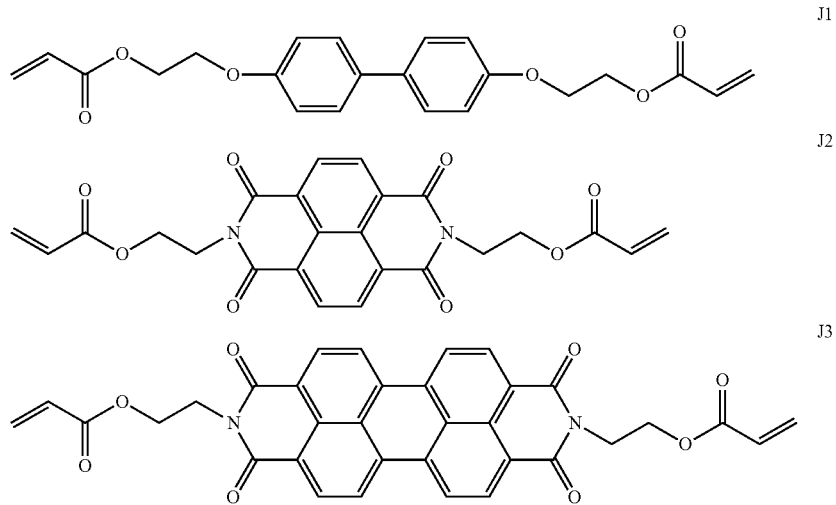

The porogen agent can be modified paraffin, which can be prepared by following process. Solid paraffin can be mixed with an aqueous dispersant solution. The aqueous dispersant solution has a concentration of 1-100 mg/mL. The mixture of solid paraffin and the aqueous dispersant solution was stirred at 60-100° C. to obtain a homogenous mixture. Acrylate monomers and benzoyl peroxide can be added drop-wise to the mixture of solid paraffin and the aqueous dispersant solution under stirring to initiate a polymerization reaction. The polymerization reaction can be run for 2.5 to 4 hours. The reaction mixture can then poured into water rapidly to give modified paraffin as a solid particle.

The dispersing agent can include gelatin and hydroxyethyl cellulose, and the weight ratio of gelatin and glycolate cellulose is 1:2. The amount of benzoyl peroxide is 1-3 weight % of acrylate monomers.

The linear polymer can be a linear long chain esters of methacrylic acid, or methacrylic acid alkyl ester, a 9-(12-((4-vinylbenzyl)oxy)dodecyl) fused ring aromatic hydrocarpolymer meets the requirements and spinning and the obtained fibrous polymeric adsorption material has an excellent strength.

In the present invention, the porogen agent can form a porous structure in the fibers of the fibrous polymeric adsorption material and increase the surface area. The lipophilic groups of the adsorption material exist not only on the fiber surface, but also in the pores. This improves the adsorption rate and capacity of the fibrous polymeric adsorption material. The amount of porogen agent has a great effect in porosity, and in turn affects the strength, flexibility, adsorption capacity and other properties.

The crosslinking agent, a diacrylate ester compound, can be J1: ([1,1'-biphenyl]-4,4'-diyl(oxa))di(ethane-2,1-diyl)diacrylate, J2: (1,3,6,8-tetraoxa-benzo[lmn][3,8]phenanthroline-2,7(1H, 3H, 6H, 8H)-diyl)di(ethane-2,1-diyl)diacrylate, or J3: (1,3,8,10-tetraoxa anthracene[2,1,9-def: 6,5,10-d'e'f'] diisoquinoline-2,9(1H, 3H, 6H, 8H)-diyl)bis(ethane-2,1- diyl)diacrylate. The structural formulas of the crosslinking agents J1, J2 and J3 are as follows:

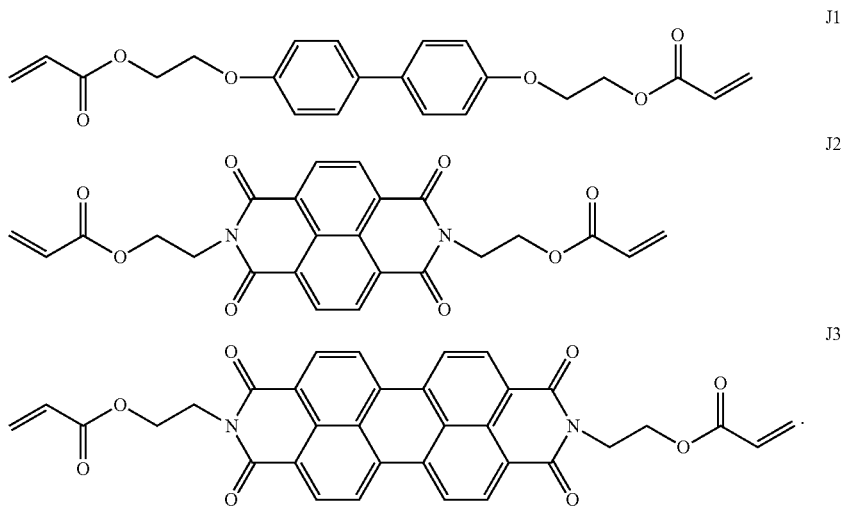

Cross-linking agents J1, J2, J3 can be prepared by following procedures: 4,4'-biphenol, naphthalene tetracarboxylic dianhydride, and perylene dianhydride react with 1-chloro-ethanol, 2-aminoethanol and 2-amino-ethanol, respectively, to obtain 2-position substituted alcohol intermediates, and then the intermediates are condensed with acryloyl chloride in pyridine solution to synthesize crosslinking agents J1, J2 and J3, respectively.

The porogen agent, modified paraffin, can be prepared by following procedures: Solid paraffin can be mixed with an aqueous dispersant solution. The aqueous dispersant solution has a concentration of 1-100 mg/mL. The mixture of solid paraffin and the aqueous dispersant solution was stirred at 60-100° C. to obtain a homogenous mixture. Acrylate monomers and benzoyl peroxide can be added drop-wise to the mixture of solid paraffin and the aqueous dispersant solution under stirring to initiate a polymerization reaction. The polymerization reaction can be run for 2.5 to 4 hours. The reaction mixture can then poured into water rapidly to give modified paraffin as a solid particle.

The dispersing agents include gelatin and hydroxyethyl cellulose, and the weight ratio of gelatin and glycolate cellulose is 1:2. The amount of benzoyl peroxide is 1-3 weight % of the acrylate monomers.

In the above process, in order to obtain optimum modification effect, after all the paraffin is dispersed into small droplets, acrylate monomer and benzoyl peroxide are added to start polymerization reaction. After the polymerization reaction is complete and the suspension solution of the reaction mixture is stabilized, the reaction mixture is poured into cold water to obtain the modified wax as fine solid particles.

Due to the using of the above technical solutions, the present invention has the following advantages:

(1) A cross linked layer is formed on the fiber surface through rapid crosslinking, and it ensures the strength of the fiber, improves the bonding strength of fibers on molecules through adding porogen agents, and accelerates the absorption rate and capacity of the fiber.

(2) Controlling the surface structure of fibers is achieved by crosslinking and pore-forming, and it results in fibrous polymeric adsorption material that meets the requirements of large adsorption capacity and long service life for industrial wastewater treatment and quick response and high treatment speed for emergency accidents.

(3) The preparation method is simple, easy to operate, requiring short preparation time, and suitable for industrial production.

Mode for Invention

A better understanding of the present invention may be obtained in light of the following Examples which are set forth to illustrate, but are not to be construed to limit the present invention.

Example 1

Preparation of Diacrylate Ester Crosslinking Agents J1, J2 and J3

1. 4,4'-dihydroxybiphenyl (20 mmol), ethylene chlorohydrin (40 mmol), and 2N sodium hydroxide solution (1.6 g, 10 mL water) were heated to reflux for 2 hours. The mixture was then stirred at room temperature for 10 hours, extracted with dichloromethane (3×30 mL), 10% sodium hydroxide (50 mL), and water (3×30 mL), and dried over with anhydrous magnesium sulfate. The solvent was distilled to obtain an intermediate product.

At 0° C., acryloyl chloride (10 mmol) was added dropwise to the above intermediate (10 mmol) pyridine (30 mL) solution. The mixture was stirred at room temperature for 12 hours, poured into ice water, and then extracted with ether (3×60 mL), 5% hydrochloric acid (60 mL), and water (3×60 mL), dried over with anhydrous magnesium sulfate, and purified by column chromatography (dichloromethane/petroleum ether) to obtain the product crosslinking agent J1.

2. Naphthalene tetracarboxylic dianhydride (7 mmol) was mixed with 2-aminoethanol (10 mmol), and ethanol (100 mL) was added. The mixture was heated to reflux for 12 hours. The solvent was evaporated, and the crude product was purified by column chromatography to obtain an intermediate product.

At 0° C., acryloyl chloride (10 mmol) was added dropwise to the above intermediate (10 mmol) pyridine (30 mL)

solution. The mixture was stirred at room temperature for 12 hours, then poured into ice water, then extracted with ether (3×60 mL), 5% hydrochloric acid (60 mL), and water (3×60 mL), dried over with anhydrous magnesium sulfate, and purified by column chromatography (dichloromethane/petroleum ether) to obtain the product crosslinker agent J2.

3. Perylene dianhydride (7 mmol) was mixed with 2-aminoethanol (10 mmol), and ethanol (100 mL) was added. The mixture was heated to reflux for 12 hours. The solvent was evaporated, and the crude product was purified by column chromatography to obtain an intermediate product.

At 0° C., acryloyl chloride (10 mmol) was added dropwise to the above intermediate (10 mmol) pyridine (30 mL) solution. The mixture was stirred at room temperature for 12 hours, then poured into ice water, then extracted with ether (3×60 mL), 5% hydrochloric acid (60 mL), and water (3×60 mL), dried over with anhydrous magnesium sulfate, and purified by column chromatography (dichloromethane/petroleum ether) to obtain the product crosslinker agent J3.

Example 2

Preparation of Fibrous Polymeric Adsorbent Material

A linear polymer was synthesized by a conventional synthetic method. The molecular weight of the linear polymer (melting-point: about 150° C.) is around 15000 to 20000 g/mol. A linear polymer yarn was prepared from the linear polymer via melt-blow spinning. The linear polymer yarn was then treated with a crosslinking agent and a porogen agent. The treated linear polymer yarn was heated at 140° C. for 35 seconds to initiate crosslinking reaction and form pores. A polymeric adsorption material including fibers with a diameter of 4 to 6 microns was obtained through rapid (35 seconds) low temperature crosslinking (140° C.). The amount of the porogen agent is 1 weight % of the linear. The polymeric adsorption material has a high adsorption rate, and the saturation time of the polymeric adsorption material is much lower than the current commercial materials (4 to 6 hours).

The above-mentioned linear polymer is poly{methyloctadecylacrylate-methacrylate, hexylacrylate-[9-(12-((4-vinylbenzyl)oxy)dodecyl) anthracene]}. The cross-linking agent is J1, J2, or J3. The amount of the crosslinking agent used is 1 weight %, 1.5 weight % or 3 weight % of the linear polymer.

Table 1 shows the effects of the amounts of the crosslinking agent on the adsorption capacity and strength of the polymeric adsorption material. The polymeric adsorption materials prepared with three different amounts of the crosslinking agents all have good adsorption properties. Specifically, when the amount is 1.5 weight %, the material shows the best adsorption capacity.

TABLE 1

The Effects of the Amounts of Crosslinking Agent on the Adsorption Capacity and Strength of the Polymeric Adsorption Material (Adsorption Object: Toluene)

| Crosslinking Agent | Amount: 3 weight % | | Amount: 1.5 weight % | | Amount: 1 weight % | |
| --- | --- | --- | --- | --- | --- | --- |
| | Adsorption Capacity (weight % of the polymeric adsorption material) | Strength | Adsorption Capacity (weight % of the polymeric adsorption material) | Strength | Adsorption Capacity (weight % of the polymeric adsorption material) | Strength |
| J1 | 400% | good | 500% | good | 500% | average |
| J2 | 500% | good | 600% | good | 650% | average |
| J3 | 400% | good | 400% | good | 400% | average |

Table 2 shows adsorption saturation time and capacity of the fibrous polymer adsorption material produced using different crosslinking agents (amount: 1.5 weight %). The fibrous polymer adsorption material produced by crosslinking agents J1 and J2 have a good adsorption effect on low viscosity oily contaminant (toluene and machine oil), while fibrous polymer adsorption material produced by J3 shows a good adsorption effect on high viscosity oily contaminant (crude oil).

TABLE 2

The effects of Different Crosslinking Agents on the Saturation Adsorption Time and Adsorption Capacity of the Fibrous Polymer Adsorption Material

| | Crosslinking Agent J1 | Crosslinking Agent J2 | Crosslinking Agent J3 |
| --- | --- | --- | --- |
| Saturation Adsorption Time | 5-10 seconds (toluene) | 8-12 seconds (machine oil) | 35-40 seconds (crude oil) |
| Adsorption Capacity (weight % of the polymeric adsorption material) | 500% (toluene) | 800% (machine oil) | 1000% (crude oi) |

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of preparing a fibrous polymeric adsorption material comprising:
    preparing a linear polymer yarn from a linear polymer via melt-blow spinning, the linear polymer having a molecular weight of 15,000 to 20,000 g/mol;
    treating the linear polymer yarn with a crosslinking agent and a porogen agent; and
    heating the treated linear polymer yarn at 130 to 150° C. for 25 to 35 seconds to obtain the fibrous polymeric adsorption material,
    wherein the fibrous polymeric adsorption material includes fibers with a diameter of 4 to 6 microns;
    wherein the crosslinking agent is in an amount of 1 to 3 weight % of the linear polymer;

wherein the crosslinking agent is a diacrylate ester compound having Formula J1, J2 or J3:

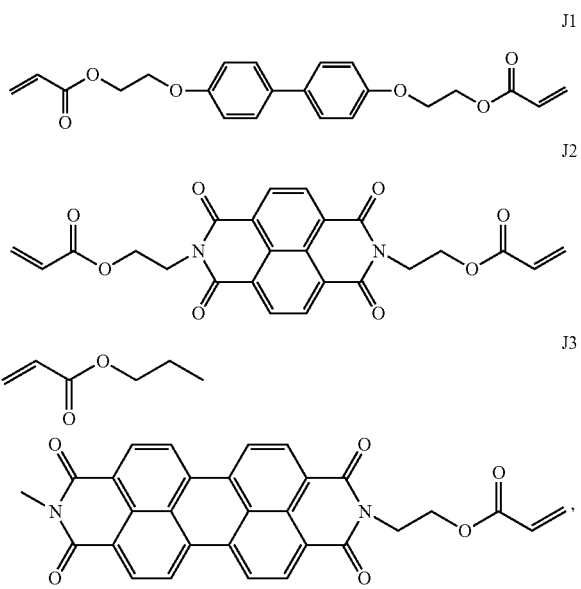

and wherein the porogen agent is in an amount of about 1 weight % of the linear polymer.

2. The method of claim 1, wherein the linear polymer is a linear long chain ester of methacrylic acid, a methacrylic acid alkyl ester, a 9-(12-((4-vinylbenzyl)oxy)dodecyl) fused ring aromatic hydrocarbon, or a 12-(fused-ring-aromatic-hydrocarbon-9-yl)dodecyl esters, the long chain ester of methacrylic acid having a $C_6$-$C_{18}$ straight alkyl chain; the methacrylic acid alkyl ester having a $C_1$-$C_6$ straight-chain alkyl; and the fused ring aromatic hydrocarbon being anthracene.

3. The method of claim 1, wherein a melting point of the linear polymer is about 150° C.

4. The method of claim 1, wherein the porogen agent is modified paraffin.

5. The method of claim 4, wherein the modified paraffin is prepared by a process comprising:

mixing solid paraffin with an aqueous dispersant solution, the aqueous dispersant solution having a concentration of 1-100 mg/mL;

stirring the mixture of the solid paraffin and the aqueous dispersant solution at 60-100° C.;

adding an acrylate monomer and benzoyl peroxide to the mixture of the solid paraffin and the aqueous dispersant solution to initiate a polymerization reaction;

running the polymerization reaction for 2.5 to 4 hours; and placing the mixture into water to obtain the modified paraffin, wherein the aqueous dispersant solution includes gelatin and hydroxyethyl cellulose; and wherein the amount of benzoyl peroxide is 1-3 weight % of the acrylate monomer.

* * * * *